(12) United States Patent
Niizuma

(10) Patent No.: US 11,941,982 B2
(45) Date of Patent: Mar. 26, 2024

(54) VEHICLE GUIDANCE DEVICE, VEHICLE GUIDANCE METHOD AND PARKING AREA

(71) Applicant: IHI Corporation, Tokyo (JP)

(72) Inventor: Motonao Niizuma, Tokyo (JP)

(73) Assignee: IHI CORPORATION, Tokyo (JP)

( * ) Notice: Subject to any disclaimer, the term of this patent is extended or adjusted under 35 U.S.C. 154(b) by 147 days.

(21) Appl. No.: 17/835,076

(22) Filed: Jun. 8, 2022

(65) Prior Publication Data

US 2022/0301433 A1 Sep. 22, 2022

Related U.S. Application Data

(63) Continuation of application No. PCT/JP2021/009321, filed on Mar. 9, 2021.

(30) Foreign Application Priority Data

Apr. 17, 2020 (JP) ................. 2020-073802

(51) Int. Cl.
*G08G 1/14* (2006.01)
*B60L 53/12* (2019.01)
*B60L 53/36* (2019.01)
*G01S 7/481* (2006.01)
*G01S 7/486* (2020.01)
*G01S 17/08* (2006.01)
(Continued)

(52) U.S. Cl.
CPC .............. *G08G 1/142* (2013.01); *B60L 53/12* (2019.02); *B60L 53/36* (2019.02); *G01S 7/4813* (2013.01); *G01S 7/4868* (2013.01); *G01S 17/08* (2013.01); *G01S 17/88* (2013.01); *G08G 1/146* (2013.01); *H04N 23/73* (2023.01)

(58) Field of Classification Search
CPC ........ G08G 1/142; G08G 1/146; G08G 1/168; B60L 53/12; B60L 53/36; B60L 2260/32; B60L 53/14; B60L 53/37; G01S 7/4813; G01S 7/4868; G01S 17/08; G01S 17/88; G01S 7/481; H04N 23/73; E04H 6/42
USPC ....................................................... 340/932.2
See application file for complete search history.

(56) References Cited

U.S. PATENT DOCUMENTS

D729,163 S 5/2015 Meyer
11,557,061 B2 * 1/2023 Cadien ............... G01S 7/52004
(Continued)

FOREIGN PATENT DOCUMENTS

JP 2004-116031 A 4/2004
JP 2008-276773 A 11/2008
(Continued)

*Primary Examiner* — Eric Blount
(74) *Attorney, Agent, or Firm* — Volpe Koenig

(57) ABSTRACT

A vehicle guidance device includes: at least one light reflector including: a retroreflector configured to reflect laser light for distance measurement emitted from a vehicle for autonomous driving; and a reflection setter configured to set either a first state in which the laser light is retroreflected from the retroreflector toward the vehicle, or a second state in which the laser light is not retroreflected from the retroreflector toward the vehicle, and a controller configured to cause the reflection setter to set the first state by setting a target position of the vehicle associated with the light reflector and cause the reflection setter to set the second state after the vehicle arrives at the target position.

15 Claims, 8 Drawing Sheets

(51) Int. Cl.
*G01S 17/88* (2006.01)
*H04N 23/73* (2023.01)

(56) References Cited

U.S. PATENT DOCUMENTS

| | | | |
|---|---|---|---|
| 2008/0266138 | A1 | 10/2008 | Ponert |
| 2016/0282468 | A1* | 9/2016 | Gruver ................ H05K 999/99 |
| 2017/0323567 | A1 | 11/2017 | Nordbruch |
| 2018/0136321 | A1* | 5/2018 | Verghese ................ G01S 17/10 |
| 2019/0225105 | A1 | 7/2019 | Niizuma |
| 2020/0088859 | A1* | 3/2020 | Shepard ................ G01S 17/89 |
| 2020/0142069 | A1* | 5/2020 | Onal .................... G01S 7/4865 |

FOREIGN PATENT DOCUMENTS

| | | |
|---|---|---|
| JP | 2013-236524 A | 11/2013 |
| JP | 2014-069647 A | 4/2014 |
| JP | 2015-113600 A | 6/2015 |
| JP | 2015-158444 A | 9/2015 |
| JP | 2016-015843 A | 1/2016 |
| JP | 2016-141161 A | 8/2016 |
| JP | 2018-500637 A | 1/2018 |
| JP | 2018-143051 A | 9/2018 |
| JP | 2020-131943 A | 8/2020 |

\* cited by examiner

SHUTTER OPEN

SHUTTER CLOSED

◨ ⋯ OPEN STATE
◧ ⋯ CLOSED STATE

VEHICLE GUIDANCE DEVICE, VEHICLE GUIDANCE METHOD AND PARKING AREA

CROSS REFERENCE TO RELATED APPLICATIONS

This application is a continuation application of International Application No. PCT/JP2021/009321, now WO 2021/210302 A1, filed on Mar. 9, 2021, which claims priority to Japanese Patent Application No. 2020-073802, filed on Apr. 17, 2020, the entire contents of which are incorporated by reference herein.

BACKGROUND

1. Technical Field

The present disclosure relates to a vehicle guidance device, a vehicle guidance method, and a parking area.

2. Description of the Related Art

LIDAR* is known as a range finder for measurement objects. For example, the LIDAR measures a time difference between an emission of pulsed laser light and a reception of reflected light thereof and calculates a distance between the LIDAR and a measurement object. Further, by scanning an emission angle of the laser light one-dimensionally or two-dimensionally, it is also possible to measure a direction from the LIDAR to the measurement object.
(*Laser Imaging Detection and Ranging or Light Detection and Ranging)

Taking advantage of the fact that the LIDAR can measure the distance and the direction to the measurement object, a wireless power supply system disclosed in JP 2013-236524 A utilizes the LIDAR to correct misalignment of the autonomous vehicle relative to the wireless power supply device.

SUMMARY

It may be desirable to guide a vehicle entering a parking area to a particular parking space among multiple parking spaces. For example, when a parking area is partitioned into parking spaces of different sizes, each parking space can be efficiently utilized by guiding vehicles according to the sizes. Also, if the vehicle being guided is an autonomous vehicle using LIDAR, the LIDAR is required to detect an indicator for guiding the vehicle to a parking space.

The present disclosure is made in view of the above circumstances. That is, it is an object of the present disclosure to provide a vehicle guidance device, a vehicle guiding method, and a parking area capable of providing an indicator for guiding an autonomous vehicle using LIDAR to a desired position.

A vehicle guidance device according to the present disclosure includes: at least one light reflector including: a retroreflector configured to reflect laser light for distance measurement emitted from a vehicle for autonomous driving (traveling); and a reflection setter configured to set either a first state in which the laser light is retroreflected from the retroreflector toward the vehicle, or a second state in which the laser light is not retroreflected from the retroreflector toward the vehicle; and a controller configured to cause the reflection setter to set the first state by setting a target position of the vehicle associated with the light reflector and causes the reflection setter to set the second state after the vehicle arrives at the target position.

The reflection setter may include an optical shutter provided on an optical path of the laser light toward the retroreflector. The controller may open the optical shutter as a setting of the first state and may close the optical shutter as a setting of the second state.

The reflection setter may be attached to the retroreflector and may include a drive mechanism for setting an angle of the retroreflector with respect to the optical path of the laser light toward the retroreflector. The controller may set the retroreflector by the drive mechanism at an angle at which the retroreflector is positioned on the optical path as a setting of the first state, and may set the retroreflector by the drive mechanism at an angle at which the retroreflector deviates from the optical path as a setting of the second state.

The at least one light reflector may include a plurality of light reflectors for the target position. The vehicle guidance device may further include a housing configured to house the at least one light reflector, including a window portion provided on the optical path, the window portion being formed of an optically transparent material. The vehicle guidance device may further include a housing with an outer surface to which the at least one light reflector is attached. The controller may acquire information about the vehicle, and may select the target position from predetermined candidate positions to which the vehicle can move based on the acquired information. The vehicle guidance device may further include a power supply unit configured to wirelessly supply electric power to a power reception device of the vehicle at the target position. The target position may be a parking space for the vehicle, and the at least one light reflector may be installed at the parking space. The target position may be a passing point on a traveling route leading to a parking space for the vehicle, and the at least one light reflector may be installed at the passing point.

A parking area according to the present disclosure includes the vehicle guidance device as described above.

A vehicle guidance method according to the present disclosure includes: setting a first state in which laser light is retroreflected at a predetermined position associated with a target position from a predetermined position toward a vehicle by setting of the target position of the vehicle which emits the laser light for distance measurement for autonomous driving; and setting a second state in which the laser light is not retroreflected at the predetermined position from the predetermined position toward the vehicle after the vehicle arrives at the target position.

The vehicle guidance method may wirelessly supply electric power to a power reception device of the vehicle at the target position. The vehicle guidance method may further includes: acquiring information about the vehicle; and selecting the target position from predetermined candidate positions to which the vehicle can move based on the acquired information.

According to the present disclosure, it is possible to provide a vehicle guidance device, a vehicle guiding method and a parking area capable of providing an indicator for guiding an autonomous vehicle using a LIDAR to a desired position.

BRIEF DESCRIPTION OF THE DRAWINGS

FIGS. 3A and 3B are diagrams for explaining a light reflector according to an embodiment, wherein FIG. 3A is a front view of the light reflector and FIG. 3B is a top view of the light reflector.

DESCRIPTION OF THE EMBODIMENTS

Figure 1:
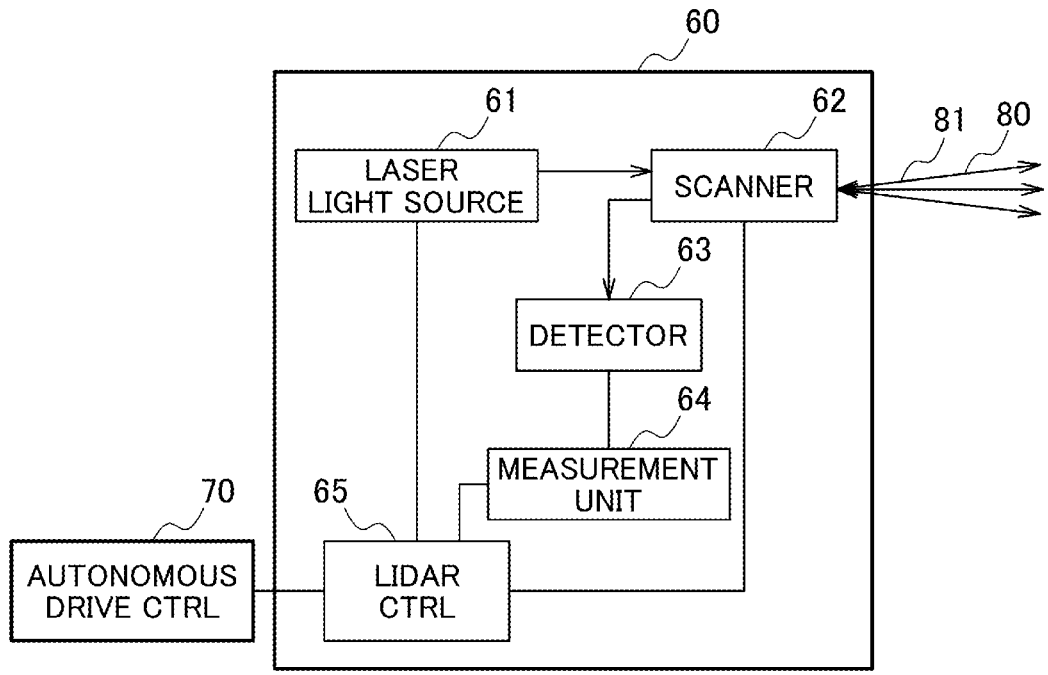
FIG. 1 is a block diagram illustrating an example of a configuration of LIDAR.

Some exemplary embodiments are described below with reference to the drawings. It should be noted that the same reference numerals are given to the common parts in the respective figures, and the redundant description thereof will be omitted.

First, a vehicle 50 applied to a vehicle guidance according to the present embodiment will be described. The vehicle 50 is an autonomous vehicle equipped with LIDAR 60 for detecting roads and obstacles, for example. The LIDAR 60 emits a laser light 80 for distance measurement for autonomous driving (traveling) by the vehicle 50 to measure a distance and/or a direction to an object in an irradiation area.

FIG. 1 is a block diagram illustrating an example of a configuration of the LIDAR 60. The LIDAR 60 includes a laser light source 61, a scanner (optical scanner) 62, a detector 63, a measurement unit 64, and a LIDAR controller 65 for controlling these.

The laser light source 61 generates a pulsed laser light 80 at a predetermined period and emits the laser light 80 to the scanner 62. The scanner 62 includes an optical reflection element such as a polygon mirror, and one-dimensionally or two-dimensionally scans an emission angle of the laser light 80 and an incidence angle of the reflected light 81. Since the same optical reflection element is used for the emitted laser light 80 and the reflected light 81 thereof, the incident angle and the emission angle are equal. The detector 63 includes a semiconductor element such as a photodiode, and receives the reflected light 81 returning toward the LIDAR 60. Here, the reflected light 81 is a portion of light emitted from the LIDAR 60 and reflected (diffusely reflected) by an object.

The measurement unit 64 measures a time difference between the emission of the laser light 80 by the laser light source 61 and the reception of the reflected light 81 of the laser light 80 by the detector 63. The measurement unit 64 sends it to the LIDAR controller 65 as time difference data. The measurement unit 64 measures an intensity of the reflected light 81 incident on the detector 63 and sends it to the LIDAR controller 65 as intensity data.

The LIDAR controller 65 acquires the time difference data and the intensity data sent from the measurement unit 64, and associates them with an emission angle (i.e., a set value of the emission angle to the scanner 62) of the laser light 80 set in the scanner 62 at the time when the time difference data and the intensity data are measured. Further, the LIDAR controller 65 calculates the distance and the direction to the object having reflected the laser light 80 as a measurement result, based on the time difference data, the intensity data and the emission angle associated with each other. The obtained measurement result is sent to an autonomous drive controller 70 of the vehicle 50.

Based on the measurement result sent from the LIDAR controller 65, the autonomous drive controller 70 recognizes the road and obstacles, and performs travel control such as steering control and speed control of the vehicle 50. When the measurement result includes intensity data having a predetermined threshold value or higher, the autonomous drive controller 70 stores the intensity data as indicator data and stores a reflection position of the laser light 80 indicating the indicator data as an indicator position. Here, the reflection position is a relative position of the object with respect to the LIDAR, which reflects (diffusely reflects) the laser light and is calculated based on the distance calculated from the time difference data and the direction calculated from the emission angle.

The predetermined threshold value as described above is set to a value capable of discriminating about the detected reflected light of the laser light 80 between light 81 reflected by the retroreflector 12 of the light reflector 11 (see FIG. 2) described later and light reflected by an object other than the retroreflector 12. Since the retroreflector 12 reflects light in the direction in which the light has come, when the laser light 80 hits the retroreflector 12, all or most of the laser light 80 is received by the detector 63 as the reflected light 81, so that the intensity of the reflected light is high. Since objects other than the retroreflector 12 reflect light in a direction other than the direction in which the light has come or diffusely reflects light in many directions, only a small part of the laser light 80 is received by the detector 63 as the reflected light 81 when the laser light 80 hits the objects other than the retroreflector 12. The intensity of the reflected light becomes low. Therefore, the difference in intensity between the light 81 reflected by the retroreflector 12 and the light reflected by an object other than the retroreflector 12 is large and can be distinguished by a threshold value. Accordingly, in the present embodiment, the above indicator data indicates the intensity of the reflected light 81 by the light reflector 11 (retroreflector 12), and the above indicator position indicates the position of the light reflector 11 (retroreflector 12) with respect to the vehicle 50.

The configuration of the LIDAR 60 is arbitrary as long as the distance and the direction to the object can be measured. For example, the LIDAR 60 may adopt a solid-state type configuration having no polygon mirror. That is, the LIDAR 60 may include laser light sources and non-rotating mirrors (e.g., MEMS mirrors) or deflection elements corresponding to the laser light sources.

Figure 2:
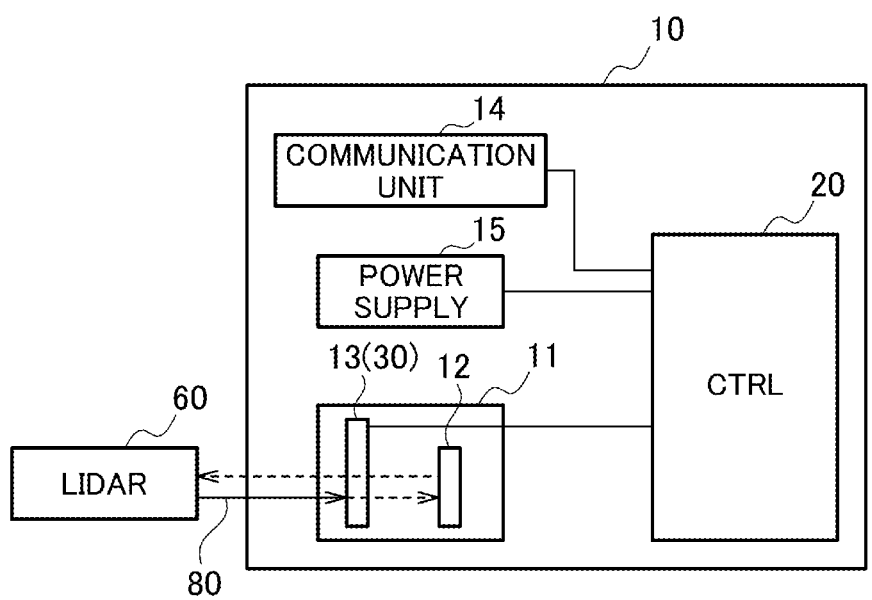
FIG. 2 is a block diagram illustrating a configuration of a vehicle guidance device according to an embodiment.
Figure 3A:
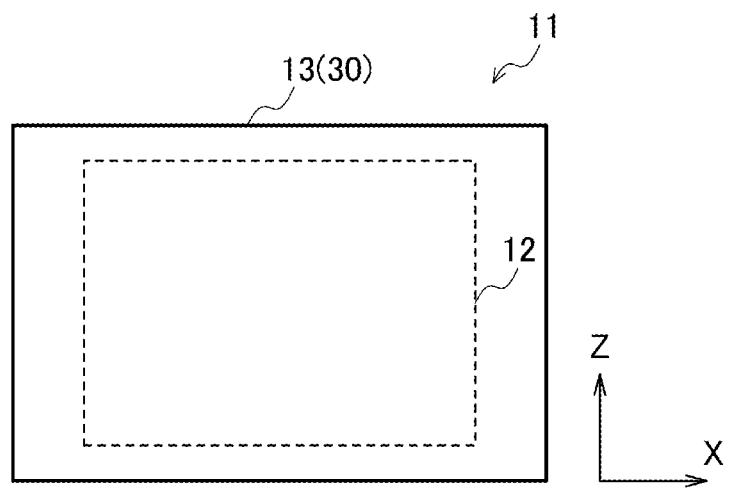
Figure 3B:
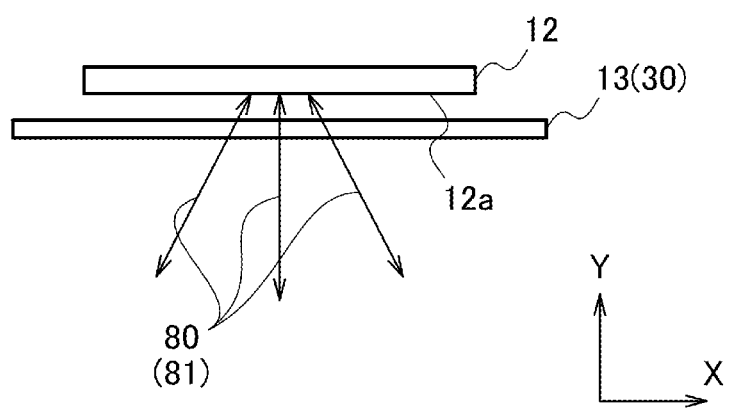
Figure 4A:
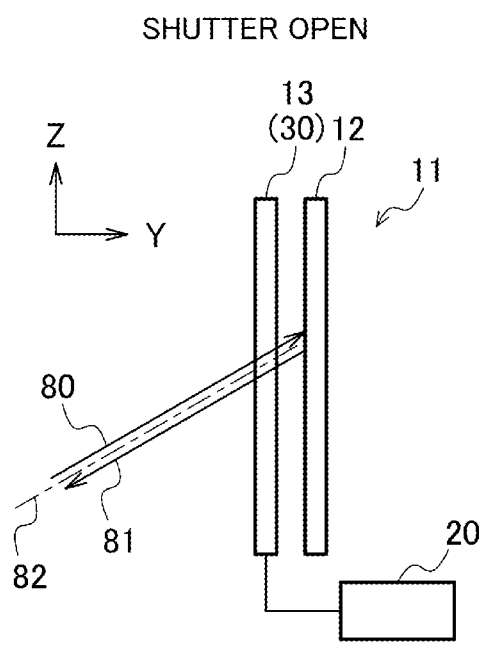
FIGS. 4A and 4B are diagrams for explaining an operation of the light reflector.
Figure 4B:
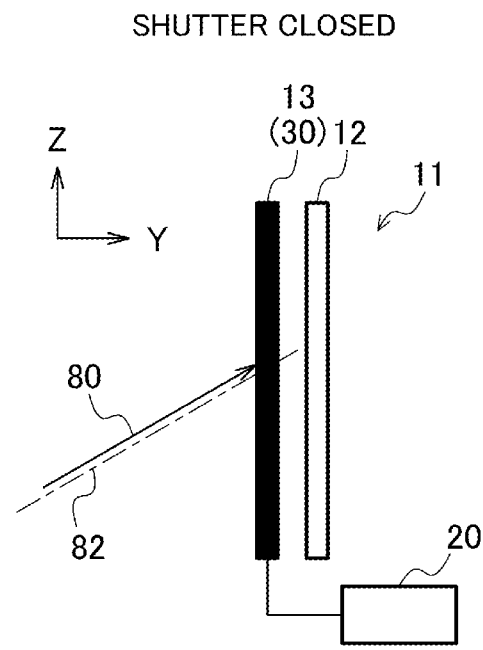

The vehicle guidance device 10 according to the present embodiment will be described. FIG. 2 is a block diagram illustrating a configuration of the vehicle guidance device 10. FIGS. 3A and 3B are diagrams for explaining a light reflector 11 according to the present embodiment, wherein FIG. 3A is a front view of the light reflector 11 and FIG. 3B is a top view of the light reflector 11. FIGS. 4A and 4B are diagrams for explaining an operation of the light reflector 11. For convenience of explanation, in FIGS. 3A to 4B, the X direction, the Y direction, and the Z direction are defined as three directions orthogonal to each other. The X direction and the Y direction are directions included in a horizontal plane, for example. The X direction represents a lateral direction and the Y direction represents a depth direction. In contrast, the Z direction is the vertical direction. These directions also apply to FIGS. 7A to 10.

As shown in FIG. 2, the vehicle guidance device 10 includes at least one light reflector 11 and a controller (shutter controller) 20. The light reflector 11 includes a retroreflector 12 and an optical shutter 13 as an example of a reflection setter 30.

As will be described later, the vehicle 50 is driven autonomously to a target position. The target position is a destination of the vehicle 50 or a passing point on a traveling route to the destination. The target position may be selected from candidate positions at which the vehicle 50 is expected to stop or pass.

The light reflector 11 is installed at a predetermined position which is associated with the target position such as a parking space. The predetermined position is, for example, the target position or a position near the target position, which are visible from the LIDAR 60. Note that relative position coordinates of the target position and the light reflector 11, which are mutually related, may be defined in advance. When the relative position coordinates are defined in advance, the coordinates are stored in advance in the autonomous drive controller 70 of the vehicle 50, for example.

When the light reflector 11 is comparatively (e.g., several tens of centimeters or longer) far from the target position, the vehicle 50 can be accurately positioned at the target position only by traveling so that the relative position coordinates of the light reflector 11 with respect to the vehicle 50 will approach the relative position coordinates stored in advance. On the other hand, when the light reflector 11 is close to the target position and thus the vehicle 50 has no problem in traveling even if the traveling target of the vehicle 50 is either of them, for example, when a distance between the light reflector 11 and the target position is equal to or shorter than a positional accuracy of the autonomous drive control (e.g., 10 cm), the vehicle 50 can reach the target position or pass the target position without specifying the relative position coordinates to be stored in advance and storing them in the autonomous drive controller 70.

The retroreflector 12 includes a reflection surface 12a which retroreflects the laser light 80. That is, the reflection surface 12a reflects the laser light 80 in a direction opposite to an incident direction of the laser light regardless of the incident direction of the laser light 80 to the reflection surface 12a. Therefore, the laser light 80 emitted from the LIDAR 60 returns to the LIDAR 60 by retroreflection of the retroreflector 12.

The reflection surface 12a of the retroreflector 12 has a structure that causes retroreflection. For example, the reflection surface 12a is formed of corner cubes arranged (distributed) two-dimensionally, metal layer including glass beads, or retroreflective paint.

The shape of the reflection surface 12a may be a rectangle as shown in FIG. 3A or other shape. When light reflectors 11 are provided, the shapes of the reflection surfaces 12a of the light reflectors 11 may be different from each other. However, when the reflection surfaces 12a of the light reflectors 11 have the same shape, it is possible to facilitate manufacture and/or replacement of them.

A reflection setter (reflection setting means) 30 sets either a first state in which the laser light 80 is retroreflected from the retroreflector 12 toward the vehicle 50 or a second state in which the laser light 80 is not retroreflected from the retroreflector 12 toward the vehicle. The controller 20 determines which of the first state and the second state is set.

An example of the reflection setter 30 is an optical shutter 13. The optical shutter 13 is provided on an optical path 82 of the laser light 80 toward the retroreflector 12. The optical shutter 13 blocks or passes the laser light 80 traveling to the retroreflector 12. The optical shutter 13 is, for example, a liquid crystal shutter in which the light transmittance of the laser light 80 changes according to an applied voltage. When the light transmittance is set high, the liquid crystal shutter is set substantially to an open state (i.e., it is opened), and the laser light 80 passes through the liquid crystal shutter. On the other hand, when the light transmittance is set low, the liquid crystal shutter is set substantially to a closed state (i.e., it is closed), and the laser light 80 is blocked by the liquid crystal shutter.

When the optical shutter 13 is set to the open state, the retroreflector 12 can retroreflect the laser light 80 from its position toward the vehicle 50 (LIDAR 60) (first state). Therefore, when the optical shutter 13 is set to the open state and the laser light 80 emitted from the LIDAR 60 enters the light reflector 11, the laser light 80 passes through the optical shutter 13 and is then reflected by the retroreflector 12 (see FIG. 4A). As described above, this reflection is a retroreflection. Therefore, the reflected light 81 of the laser light 80 passes through the optical shutter 13 again and enters the detector 63 of the LIDAR 60.

On the other hand, when the optical shutter 13 is set to the closed state, the retroreflector 12 cannot retroreflect the laser light 80 from its position toward the vehicle 50 (LIDAR 60) (second state). That is, the laser light 80 emitted from the LIDAR 60 is blocked by the optical shutter 13 and is not reflected by the retroreflector 12 (see FIG. 4B).

The controller 20 opens the optical shutter 13 as the setting of the first state. Specifically, the controller 20 opens the optical shutter 13 by setting a target position of the vehicle 50 associated with the light reflector 11. The target position may be set by the controller 20 based on information about the vehicle 50, which will be described later, or may be set by means other than the vehicle guidance device 10 (e.g., a management device or a manager of the vehicle guidance device 10). After the vehicle 50 arrives at the target position, the controller 20 closes the optical shutter 13 as the setting of the second state. The controller 20 maintains the closed state of the optical shutter 13 when the vehicle 50 is not scheduled to move to the target position.

When viewed from the vehicle 50 (LIDAR 60), the intensity of the reflected light 81 varies according to the opening and closing of the optical shutter 13. That is, when the optical shutter 13 is open, the laser light 80 is reflected by the retroreflector 12, so that the intensity data of the reflected light 81 is equal to or greater than a predetermined threshold value, and the position (indicator position) of the retroreflector 12 behind the optical shutter 13 is specified as the position of the light reflector 11. When the optical shutter 13 is closed, the laser light 80 does not reach the retroreflector 12 and is reflected in a direction other than the incident direction or diffusely reflected by the optical shutter, so that the intensity data of the reflected light 81 is below the predetermined threshold value and is not stored as indicator data. That is, the light reflector 11 switches between execution and stop of retroreflection of the laser light 80 by opening and closing the optical shutter 13, thereby switching whether or not the light reflector functions as an indicator recognized by the vehicle 50 in the formulation of the traveling route to the target position by the vehicle 50.

It is also conceivable that two or more candidates (candidate positions) serving as the target position of the vehicle 50 (i.e., candidates to which the vehicle 50 can move) exist. In this case, the controller 20 may acquire information about the vehicle 50 described later via a communication unit 14, and select a target position from the candidate positions based on the acquired information.

The vehicle guidance device 10 may include at least one communication unit 14. The communication unit 14 is provided, for example, at the entrance of a parking area (parking lot) 100 (see FIG. 5), the housing 22 (see FIG. 9E), or both. A communication unit 14 communicates with the vehicle 50 by wireless communication and acquires information about the vehicle 50 from the vehicle 50. Information about the vehicle 50 is, for example, the type, size, and operation status of the vehicle 50. If the vehicle 50 is an electric vehicle or a plug-in hybrid vehicle, the information about the vehicle 50 may include, for example, a charging status such as a maximum capacity of a rechargeable battery and a state of charge thereof.

The vehicle guidance device 10 may include a power supply unit 15 together with the communication unit 14. The power supply unit 15 wirelessly supplies electric power to a power reception device (not shown) of the vehicle 50 by using magnetic coupling between coils caused by magnetic resonance or electromagnetic induction. Alternatively, the power supply unit 15 may wirelessly supply electric power using electric coupling between electrodes caused by electric field resonance. In either way, a known circuit configuration can be applied. In this case, the power supply unit 15 is housed in the housing 22 together with the communication unit 14 (see FIG. 9E). The communication unit 14 communicates with the vehicle 50 about control of supplying power to the power reception device (not shown) of the vehicle 50 by the power supply unit 15. It may be possible that the power supply unit 15 is housed in the housing 22, and either or both of the communication unit 14 and the controller 20 is provided away from the housing 22. It may be possible that a coil and a power circuit constitute the power supply unit 15 and that the coil is housed in the housing 22, and the power circuit is provided away from the housing 22.

Guidance of the vehicle 50 using the vehicle guidance device 10 will be described.

As will be described later, the vehicle 50 is driven autonomously to a target position. As described above, the vehicle 50 autonomously travels. With this reason, the LIDAR 60 performs a distance measurement and a direction measurement at least while the vehicle 50 is moving. When the vehicle 50 specifies the light reflector 11 retroreflecting the laser light 80, the vehicle 50 autonomously travels to a target position associated with the specified light reflector 11.

Figure 5:
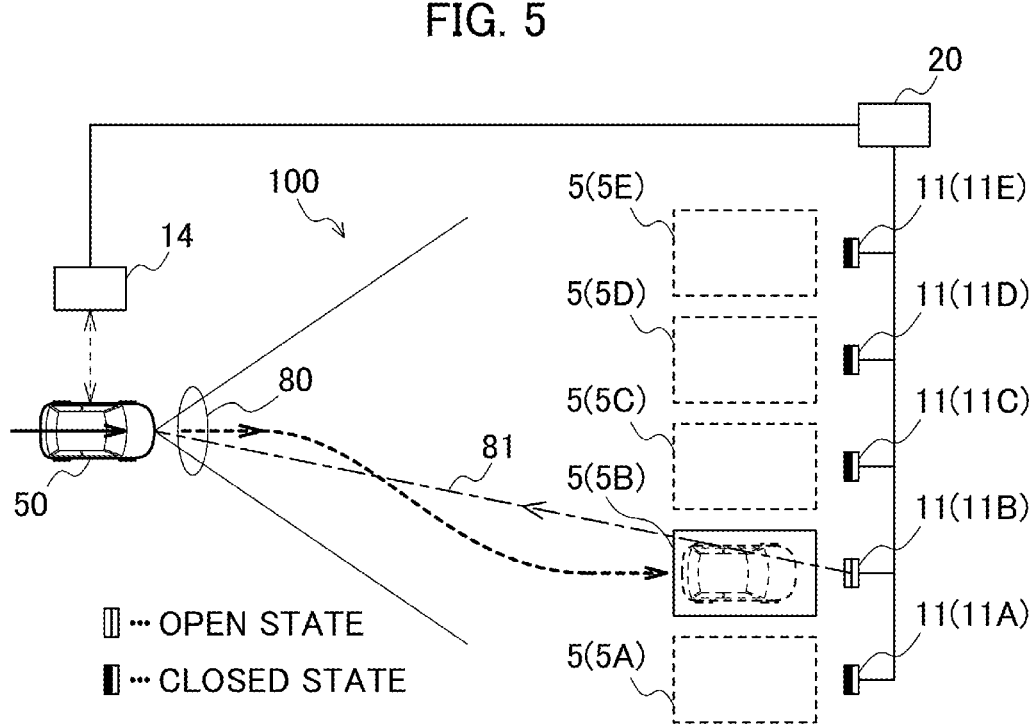
FIG. 5 is a diagram for explaining a guidance of a vehicle to a selected parking space.

FIG. 5 is a diagram for explaining the guidance of the vehicle 50 to the parking space 5B selected from the parking spaces 5. The number of parking spaces 5 is not limited and can be set arbitrarily. In the following description, the number of parking spaces 5 is set to 5. The parking space 5B is one of the parking spaces 5 that are marked off (i.e., predetermined) in the parking area 100. That is, the parking spaces 5 are the candidates (candidate positions) to which the vehicle 50 is guided, and one of them becomes the parking space 5B as the target position.

For convenience of description, the five parking spaces 5 are denoted by 5A, 5B, 5C, 5D, 5E, and it is assumed that the vehicle 50 is directed to the parking space 5B. The light reflector 11 is individually associated with the parking spaces 5A to 5E, and is installed at a predetermined position with respect to the position of the parking space 5. For convenience of explanation, the symbol "11A" represents the light reflector 11 installed in association with the parking space 5A. Similarly, the symbols of the light reflectors 11 installed in association with the parking spaces 5B, 5C, 5D, and 5E are denoted by 11B, 11C, 11D, and 11E, respectively.

In the present embodiment, the light reflectors 11A, 11B, 11C, 11D, and 11E are installed in the back of the parking spaces 5A, 5B, 5C, 5D, and 5E, respectively. That is, the parking spaces 5A, 5B, 5C, 5D, and 5E are associated with the light reflectors 11A, 11B, 11C, 11D, and 11E, respectively, under the relation in that the parking spaces 5A, 5B, 5C, 5D, and 5E are in front of the light reflectors 11A, 11B, 11C, 11D, and 11E, respectively. Although the parking spaces 5 (5A, 5B, 5C, 5D, and 5E) are indicated by broken lines in the figure, broken lines or frame lines indicating the parking spaces may or may not be drawn on the ground.

When the vehicle 50 enters the parking area 100, the controller 20 sets the parking space 5B as the destination of the vehicle 50 from among the parking spaces 5A to 5E. The setting of the parking space 5B is based on the information about the vehicle 50 as described above. This information is acquired, for example, by communication between the vehicle 50 and the communication unit 14 when the vehicle 50 enters the parking area 100.

After the parking space 5B is set as the destination of the vehicle 50, the controller 20 sets the optical shutter 13 of the light reflector 11B to the open state and sets the optical shutter 13 of the light reflectors 11A, 11C, 11D, 11E to the closed state. That is, there is set a state where the laser light 80 is to be retroreflected to the vehicle 50 (LIDAR 60) by the light reflector 11B, and there is set a state where the laser light 80 is not to be retroreflected to the vehicle 50 (LIDAR 60) by the light reflectors 11A, 11C, 11D, and 11E.

While the open state and the closed state are maintained, the LIDAR 60 emits (irradiates) the laser light 80 and scans the laser light 80. When the light reflectors 11A to 11E are located in a space (irradiation space) where the laser light is irradiated and scanned, the LIDAR 60 receives the reflected light 81 of the laser light 80 from the light reflector 11B. The laser scanning is performed over a sufficiently wide range so that the object in front of the vehicle 50 is measured by the LIDAR 60 even if the vehicle 50 changes the traveling direction, and the irradiation space extends from the front of the vehicle 50 to the right and left.

The intensity of the reflected light 81 of the laser light 80 due to retroreflection is remarkably higher than the reflected light of the laser light 80 from a place where retroreflection does not occur. That is, the intensity of the reflected light 81 from the light reflector 11B with the optical shutter 13 under the open state is significantly higher than the reflected light 81 from the light reflectors 11A, 11C, 11D, and 11E with the optical shutter 13 under the closed state and objects other than the light reflectors 11 in the irradiation space. Therefore, by comparing the intensity of the reflected light 81 of the laser light 80 that has reached the detector 63 with a predetermined threshold value, the vehicle 50 can specify the reflected light 81 that has arrived by the retroreflection of the light reflector 11B. Since the reflected light 81 due to retroreflection is specified, the vehicle 50 specifies the location of the light reflector 11B and further specifies the location of the parking space 5B associated with the light reflector 11B. Thus, the vehicle 50 can autonomously travel to the specified parking space 5B.

The irradiation space extends from the front of the vehicle 50 to the right and left. Therefore, during autonomous driving toward the parking space 5B, the light reflector 11B is included in the irradiation space, and the LIDAR 60 continues the distance measurement (i.e., measurements of distance and direction) with respect to the light reflector 11B. Since the position of the light reflector 11B as seen from the vehicle 50 is known by this distance measurement, the vehicle 50 moves to an appropriate position in front of the light reflector 11B as the target position. For example, a position 3 m before the light reflector 11B is assumed to be an appropriate stop position. The vehicle 50 moves to the position 3 m before the light reflector 11B as the target position. As the result, the vehicle 50 moves to a desired position in the parking space 5B, and the travel control to the parking space 5B is completed. That is, the vehicle 50 arrives at the target position.

In accordance with the arrival, the controller 20 recognizes that the vehicle 50 has arrived at the parking space 5B. For example, the controller 20 receives a notification of arrival from the vehicle 50 via the communication unit 14. Alternatively, the controller 20 detects the arriving vehicle 50 with a position sensor (not shown). Thereafter, same as the other light reflectors 11A, 11C, 11D, and 11E, the light reflector 11B is set in the state in which the laser light 80 is not retroreflected. That is, the optical shutter 13 of the light reflector 11B is closed.

Further, if the power supply unit 15 is provided in each parking space 5, when the power supply unit 15 receives a request for supplying electric power from the vehicle 50 via the communication unit 14, the power supply unit 15 starts to supply the electric power to the power reception device (not shown) of the vehicle 50 after the arrival of the vehicle 50. Thereafter, when the power supply unit 15 receives a request for terminating the supply of electric power from the vehicle 50 via the communication unit 14, the power supply unit 15 terminates the supply of electric power. The power supply unit 15 is provided at a position where the wireless power supply is appropriately carried out from the power supply unit 15 to the power reception device (not shown) of the vehicle 50 when the vehicle arrives at the target position.

As described above, the light reflector 11 retroreflects the laser light 80 emitted from the LIDAR 60. Because of the retroreflection, the LIDAR 60 can receive the reflected light 81 of the laser light 80 by the light reflector 11 as long as the light reflector 11 is located in the irradiation space of the laser light 80. Since the LIDAR 60 is mounted forward on a front face of the vehicle 50 and the irradiation space extends from the front of the vehicle 50 to the right and left, as long as the vehicle 50 forwardly approaches the parking space 5, the reflected light 81 of the laser light 80 by the light reflector 11 can be received regardless of the relative position of the vehicle 50 with respect to the light reflector 11.

When the vehicle 50 enters within a predetermined range centered around the target position, the vehicle 50 may perform control to define an approach route of the vehicle 50 relative to the target position. For example, when the laser light 80 is scanned in left-right direction, by specifying positions (positions in the horizontal plane) of two reflection points on the left and right ends of the reflection surface 12a of the retroreflector 12, the autonomous drive controller 70 of the vehicle 50 can specify a direction connecting the two points (i.e., a tangential direction of the reflection surface 12a) as seen from the vehicle 50 (LIDAR 60). Since the specified direction is one of the tangential directions of the reflection surface 12a, the autonomous drive controller 70 of the vehicle 50 can specify the direction (orientation) of the vehicle 50 with respect to the reflection surface 12a based on the specified direction. The autonomous drive controller 70 of the vehicle 50 performs steering so that the specified direction of the vehicle 50 is oriented in a predetermined direction (e.g., a direction included in a predetermined plane (e.g., the horizontal plane or a traveling surface of the vehicle 50) and orthogonal to the tangential direction of the reflection surface 12a).

Further, the vehicle 50 may be equipped with an on-vehicle camera (not shown) for imaging a location toward the traveling direction in addition to the LIDAR 60. In this case, when the vehicle 50 enters the predetermined range as described above, image processing by the on-vehicle camera (not shown) may start, and the position coordinates and the direction of the vehicle 50 with respect to the parking space 5 may be specified from the image processing for broken lines or frame lines drawn on the ground to indicate the parking space 5 (e.g., 5B). In some cases, the vehicle 50 can use a global positioning system (GPS) or a gyro sensor. In this case, when the vehicle 50 enters the predetermined range described above, the position coordinates and direction of the vehicle 50 with respect to the parking space 5 may be specified based on the measurement data by at least one of them. When the GPS or the gyro sensor is used, broken lines or frame lines indicating the parking space 5 (or 5B) is not necessarily drawn on the ground (i.e., the surface on which the vehicle 50 travels). In either case, the autonomous drive controller 70 of the vehicle 50 performs steering so that the vehicle 50 reaches the desired position in the parking space 5 based on the specified position coordinates and direction of the vehicle 50.

When the parking space 5A instead of the parking space 5B is set as the destination of the vehicle 50, the controller 20 sets the optical shutter 13 of the light reflector 11A to the open state and sets the optical shutter 13 of the light reflectors 11B, 11C, 11D and 11E to the closed state. The intensity of the reflected light 81 from the light reflector 11A, in which the optical shutter 13 is in the open state, is significantly higher than the reflected light 81 from the light reflectors 11B, 11C, 11D, and 11E, in which the optical shutters 13 are in the closed state, and objects other than the light reflectors 11 in the irradiation space. The vehicle 50 compares the intensity of the reflected light of the laser light 80 that has reached the detector 63 with the predetermined threshold value to identify the reflected light 81 that has arrived by the retroreflection of the light reflector 11A and to specify the position of the parking space 5A associated with the light reflector 11A. With this operation, the vehicle 50 can autonomously travel to the specified parking space 5A. After the controller 20 recognizes an arrival of the vehicle 50 at the parking space 5A, the optical shutter 13 of the light reflector 11A is closed.

When the parking space 5C is set as the destination of the vehicle 50, the controller 20 sets the optical shutter 13 of the light reflector 11C to the open state and sets the optical shutter 13 of the light reflectors 11A, 11B, 11D and 11E to the closed state. The intensity of the reflected light 81 from the light reflector 11C, in which the optical shutter 13 is in the open state, is significantly higher than the reflected light 81 from the light reflectors 11A, 11B, 11D, and 11E, in which the optical shutters 13 are in the closed state, and objects other than the light reflectors 11 in the irradiation space. The vehicle 50 compares the intensity of the reflected light of the laser light 80 that has reached the detector 63 with the predetermined threshold value to identify the reflected light 81 that has arrived by the retroreflection of the light reflector 11C and to specify the position of the parking space 5C associated with the light reflector 11C. With this operation, the vehicle 50 can autonomously travel to the specified parking space 5C. After the controller 20 recognizes an arrival of the vehicle 50 at the parking space 5C, the optical shutter 13 of the light reflector 11C is closed.

This operation is the same when the parking space 5D or the parking space 5E is set as the destination of the vehicle 50.

The light reflector 11 may be installed at a passing point on the traveling route leading to the destination. The passing point may be, for example, an intersection, a branch, or a middle point (i.e., a position on the road that is sufficiently far from the intersection and the branch) on a road that is a candidate of the traveling route.

When the light reflector 11 is installed at a passing point, the reflection surface 12a of the retroreflector 12 of the light reflector 11 at the passing point is opposed to (faces) a direction in which the vehicle 50 can travel. For example, when the light reflector 11 is installed on a four-way intersection as an example of the intersection (see FIG. 6), the light reflector 11 is installed around the cross point of the four-way intersection on each of roads constituting the four-way intersection. Further, the reflection surface 12a of the retroreflector 12 of each light reflector 11 faces in a direction from the intersection of the four-way intersection toward the corresponding road.

For example, when the passing point is located in the middle of a straight road and the vehicle 50 is allowed to travel in both directions on the road, two light reflectors 11 are installed at the passing point, and the reflection surfaces 12a of the respective retroreflectors 12 face in opposite directions along the road. When the passing point is located in the middle of a straight traveling road and the vehicle 50 is allowed to travel only in one direction on the road, one light reflector 11 is installed at the passing point, and the reflection surface 12a of the retroreflector 12 faces against the allowed traveling direction.

Figure 6:
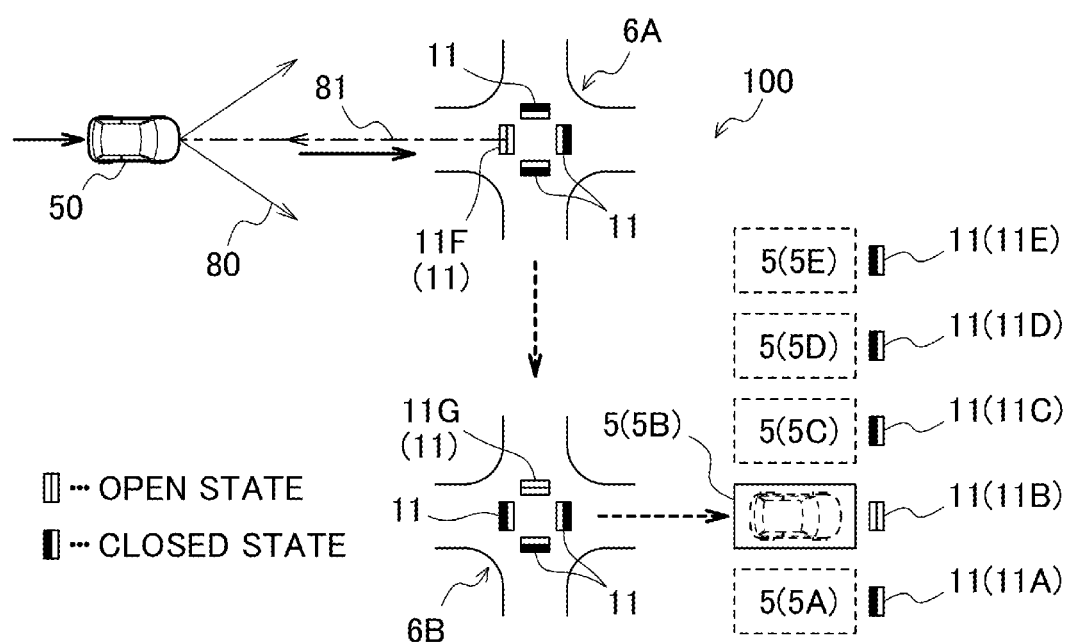
FIG. 6 is a diagram for explaining a guidance of a vehicle along a traveling route leading to a selected parking space.

FIG. 6 is a diagram for explaining a guidance of the vehicle 50 along the traveling route leading to the selected parking space 5B. As described above, the light reflector 11 is installed at a passing point. For example, as shown in FIG. 6, four light reflectors 11 are respectively installed at intersections 6A and 6B as passing points. The reflection surface 12a of the retroreflector 12 of each light reflector 11 faces the corresponding road. The processing for specifying the reflected light 81 that has arrived by retroreflection and the processing for specifying the position of the passing point associated with the light reflector 11 are the same as those described above, and thus the description thereof will be omitted.

It is assumed that the parking space 5B is set as the destination of the vehicle 50. In this case, the controller 20 determines the traveling route of the vehicle 50 to the parking space 5B, sets the optical shutters 13 of the light reflectors 11 on the determined traveling route to the open state, and sets the optical shutters 13 of the other light reflectors 11 to the closed state. Therefore, in the example shown in FIG. 6, the controller 20 sets the optical shutter 13 of the light reflector 11B associated with the parking space 5B to the open state and sets the optical shutters 13 of the light reflectors 11A, 11C, 11D, 11E associated with the other parking spaces to the closed state.

In the example shown in FIG. 6, it is further assumed that intersections 6A and 6B are located on the traveling route. Therefore, the controller 20 sets the optical shutter 13 of the light reflector 11F of the four light reflectors 11 at the intersection 6A to the open state and sets the optical shutter 13 of the other light reflectors 11 to the closed state. Similarly, the controller 20 sets the optical shutter 13 of the light reflector 11G of the four light reflectors 11 at the intersection 6B to the open state, and sets the optical shutter 13 of the other light reflectors 11 to the closed state. Here, the light reflectors 11F and 11G are light reflectors in each of which the reflection surface 12a of the retroreflector 12 faces against the traveling direction of the vehicle 50 among the four light reflectors installed at the respective intersections.

The LIDAR 60 installed in the vehicle 50 receives the reflected light 81 of the laser light 80 by retroreflection, thereby detecting the light reflector 11F having the optical shutter 13 in the open state at the intersection 6A. As the result, the vehicle 50 is guided to the intersection 6A. After the vehicle 50 is guided to the intersection 6A, or after the vehicle 50 approaches a sufficiently close position from the intersection 6A, the LIDAR 60 receives the reflected light 81 of the laser light 80 by retroreflection, and detects the light reflector 11G having the optical shutter 13 in the open state at the intersection 6B as the next reflection point. As the result, the vehicle 50 is guided to the intersection 6B. Further, after the vehicle 50 is guided to the intersection 6B, or after the vehicle 50 approaches a position sufficiently close to the intersection 6B, the LIDAR 60 detects the light reflector 11B having the optical shutter 13 in the open state by receiving the reflected light 81 of the laser light 80 by retroreflection. As the result, the vehicle 50 is guided to the parking space 5B.

The operation is the same when any one of the parking spaces 5A, 5C, 5D and 5E other than the parking space 5B is set as the destination of the vehicle 50. That is, the optical shutters 13 of the light reflectors 11 on the traveling route leading to the set parking space 5 are set to the open state, and the optical shutters 13 of the other light reflectors 11 are set to the closed state.

When optical shutters 13 in the open state are assumed to exist in the irradiation space of the laser light 80 by the LIDAR 60, the controller 20 may sequentially set the optical shutters 13 in the irradiation space, which is to be set in the open state, from the closed state to the open state in order from the one closest to the vehicle 50. In this case, the change of setting to the optical shutter 13 from the open state to the closed state may be made in response to the passing of the vehicle 50 or the approach within a predetermined range with respect to the light reflector 11 whose setting is to be changed.

Instead of sequentially opening and closing the optical shutters 13 of the light reflectors 11 on the traveling route, all of them may be set to the open state until the vehicle 50 is guided to the parking space 5B. In this case, the traveling route of the vehicle 50 follows the order of the reflected light 81 detected by the LIDAR 60. There is a possibility that two or more reflected lights 81 are received from the irradiation space. In this case, the autonomous drive controller 70 compares the distances to the light reflectors 11 measured by the LIDAR 60, and sets the light reflector 11 closest to the LIDAR 60 as the first passing point. Thereby, the vehicle 50 is guided to the parking space 5B as the destination through the set passing points. In any of the above cases, after the vehicle 50 arrives at the parking space 5B, all optical shutters 13 are set to the closed state.

According to the present embodiment, it is possible to guide a vehicle (i.e., an autonomous vehicle equipped with a LIDAR) to a target position such as a destination or a passing point of the vehicle, and to provide an indicator therefor. Further, when there are two or more candidates for the target position, it is also possible to guide the vehicle to a specific candidate among them, and to provide an indicator therefor. For example, if two or more parking spaces are marked off into different sizes, it is possible to select a parking space suitable for the size of the vehicle and guide the vehicle to the selected parking space, and to provide an indicator therefor. In this case, each parking space can be efficiently utilized. Further, since the candidate of the target position is defined by the relative position with respect to the light reflector 11, it is not required to measure the absolute position (e.g., latitude and longitude) of the candidate of the target position by surveying or other methods. For example, when the position of the parking space 5A is temporarily moved, the light reflector 11A is also moved while its relative position with respect to the parking space 5A is maintained. With such movement, it is possible to guide the vehicle 50 to the moved parking space 5A and to provide an indicator therefor, without making any change to the controller 20.

The wireless power supply does not require connecting of the charging cable to the vehicle. Therefore, electric power can be automatically supplied to the vehicle without any human work (i.e., connection of the charging cable to the vehicle) as long as the vehicle is guided to a position where the electric power can be fed from the wireless power supply device. When the vehicle guidance device includes the aforementioned electric power supply, in other words, when the vehicle guidance device serves as a wireless power supply device, the vehicle can move to the wireless power supply device by autonomous driving and the supply of power can automatically start without any human operation and/or work. Accordingly, when the vehicle is an electric vehicle or a plug-in hybrid vehicle, it is possible to supply the required electric power with the wireless power supply for charging the battery of the vehicle and for air conditioning (e.g., cooling and heating) in the vehicle without any personnel. Further, it is possible to select an appropriate parking space and guide the vehicle to it depending on a charging state such as a power supply capacity of the power supply unit, a capacity of a rechargeable battery installed in the vehicle or the state of charge of the rechargeable battery, thus charging in each parking space can be efficiently performed.

In any of the above cases, autonomous driving by LIDAR alone is possible at least to the vicinity of the target position.

Figure 7A:
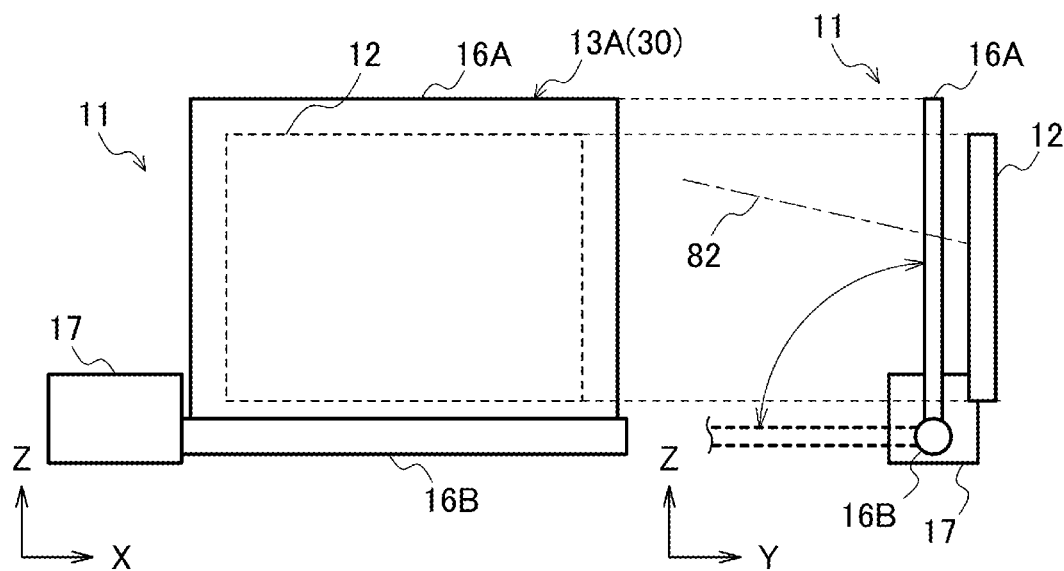
FIGS. 7A and 7B are diagrams illustrating modifications of an optical shutter according to an embodiment.
Figure 7B:
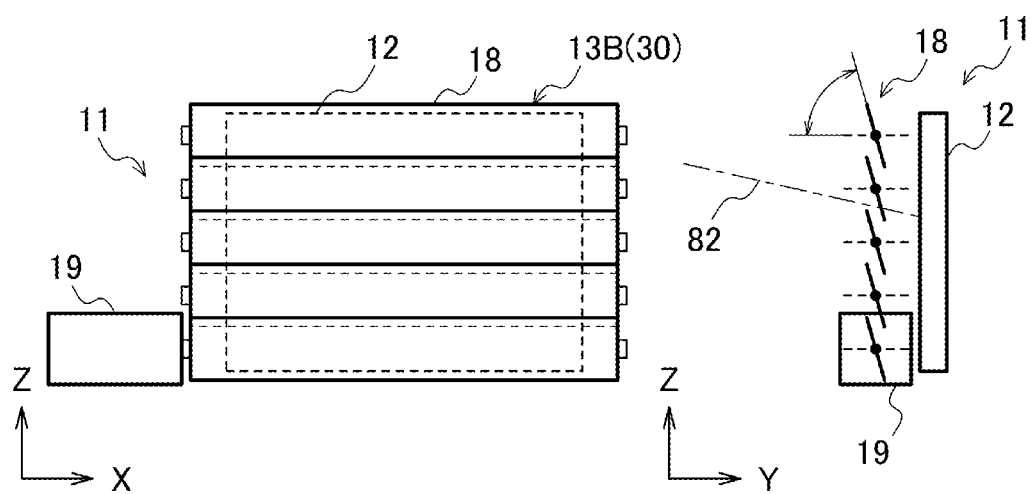

FIGS. 7A and 7B are diagrams illustrating modifications of the optical shutter 13 according to an embodiment. As shown in FIG. 7A, the optical shutter 13A as the first modification includes a plate member 16A, a shaft 16B, and a drive mechanism (driver) 17. The plate member 16A is opaque against the laser light 80. The shaft 16B is attached to an edge of the plate member 16A. The drive mechanism 17 includes a motor (not shown) and rotates the shaft 16B to set the retroreflector 12 to the open state or the closed state under the control of the controller 20. It should be noted that the open state (i.e., the first state) is a state in which the plate member 16A is horizontally arranged and light can be incident on a front surface of the retroreflector 12, and that the closed state (i.e., the second state) is a state in which the plate member 16A is vertically arranged and covers the front surface of the retroreflector 12 and the light to be incident on the retroreflector 12 is blocked.

As shown in FIG. 7B, the optical shutter 13B as the second modification has a louver 18 and a drive mechanism (driver) 19. The louver 18 includes a plurality of strip-shaped plate members opaque against the laser light 80. These plate members extend, for example, in the X direction and rotate synchronously around an axis extending in the same direction. The drive mechanism 19 includes a motor (not shown) and opens and closes the louver 18 to set the retroreflector 12 to the open state or the closed state under the control of the controller 20. The open state (i.e., the first state) is a state in which the louver 18 is horizontally arranged and light can be incident on the front surface of the retroreflector 12, and the closed state (i.e., the second state) is a state in which the louver 18 is vertically arranged and covers the front surface of the retroreflector 12 and light to be incident on the retroreflector 12 is blocked.

Figure 8:
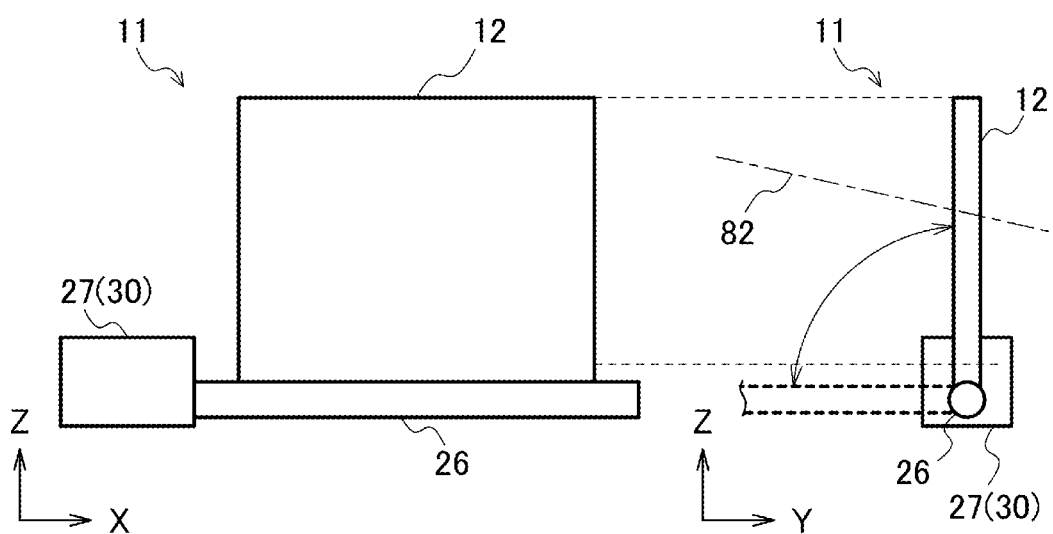
FIG. 8 is a diagram illustrating an example of a configuration of the light reflector including a drive mechanism according to an embodiment.

Another example of the reflection setter 30 is a drive mechanism (driver) 27 attached to the retroreflector 12. FIG. 8 is a diagram illustrating an example of a configuration of the light reflector 11 including the drive mechanism 27. The drive mechanism 27 includes a motor (not shown) and sets an angle (in other words, an attitude) of the retroreflector 12 with respect to an optical path 82 of the laser light 80 toward the retroreflector 12. That is, the light reflector 11 according to this example switches between the open state and the closed state by changing the angle (attitude) of the retroreflector 12 with respect to the optical path 82 without using an optical shutter physically constituted. An end (e.g., a lower end) of the retroreflector 12 is attached to a shaft 26. The shaft 26 is rotated by the drive mechanism 27. Further, the drive mechanism 27 is controlled by the controller 20.

The retroreflector 12 is to be positioned vertically or horizontally by rotation of the shaft 26. When the angle of the retroreflector 12 is set to a value which arranges the retroreflector 12 vertically, the retroreflector 12 (reflection surface 12a) is located on the optical path 82. Therefore, the laser light 80 can be incident on the reflection surface 12a of the retroreflector 12. On the other hand, when the angle of the retroreflector 12 is set to an angle which arranges the retroreflector 12 horizontally, the reflection surface 12a of the retroreflector 12 is bent downward, and the retroreflector 12 (reflection surface 12a) deviates from the optical path 82. That is, the laser light 80 is not incident on the retroreflector 12. In this example, the open state (i.e., the first state) is a state in which the laser light 80 can be incident on the reflection surface 12a of the retroreflector 12, and the closed state (i.e., a second state) is a state in which the laser light 80 is not incident on the retroreflector 12.

Figure 9A:
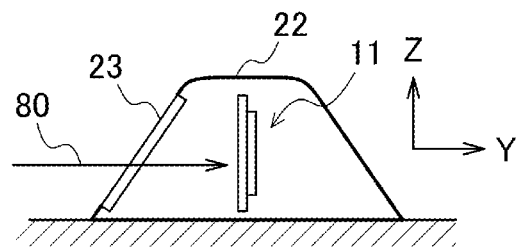
FIGS. 9A to 9E are diagrams illustrating examples of installation of the light reflector.
Figure 9B:
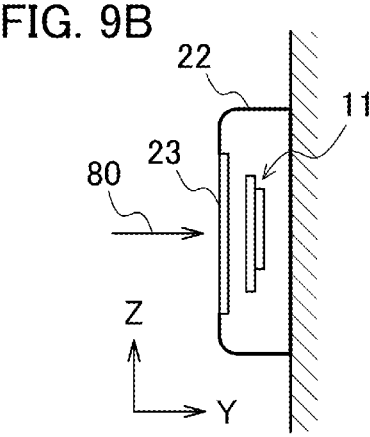
Figure 9C:
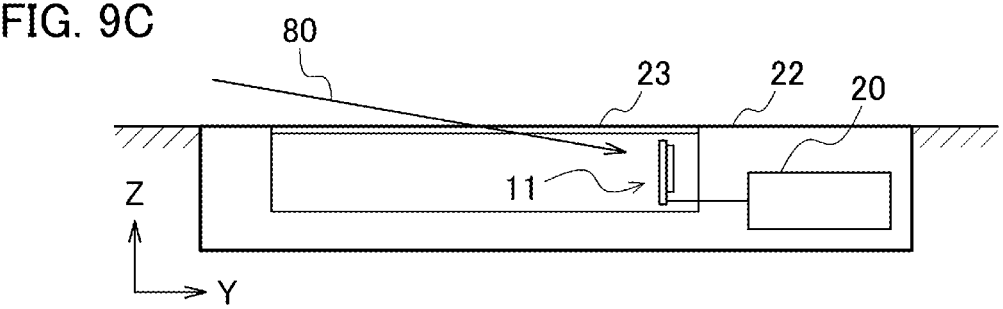
Figure 9D:
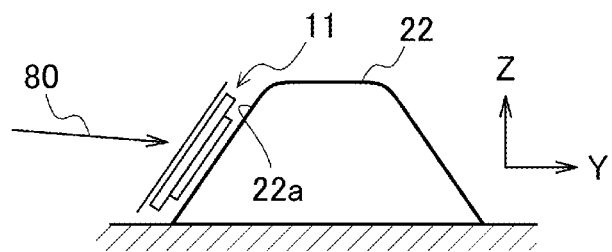
Figure 9E:
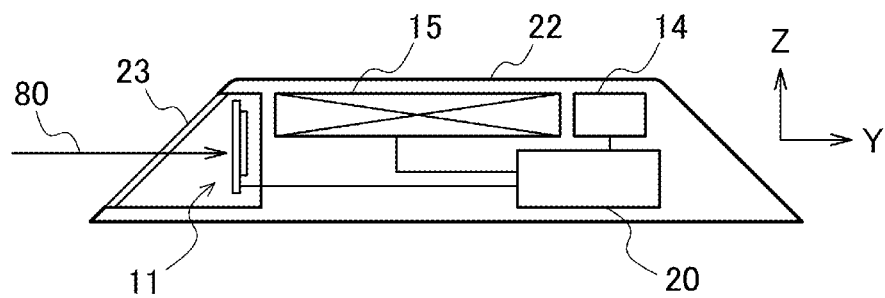

FIGS. 9A to 9E are diagrams illustrating examples of installation of the light reflector 11. As shown in FIGS. 9A to 9C, the light reflector 11 may be housed in the housing 22. Alternatively, as shown in FIG. 9D, it may be attached to an outer surface 22a of the housing 22.

When the light reflector 11 is housed in the housing 22, the housing 22 may have a window portion 23 provided on the optical path 82 of the laser light 80. The window portion 23 is made of an optically transparent material at the wavelength of the laser light 80, allows the laser light 80 to pass, and protects the light reflector 11 from contaminants such as dust.

When the light reflector 11 is attached on the outer surface 22a of the housing 22, the light reflector 11 is secured to the outer surface 22a by a predetermined attachment (not shown). In this case, the housing 22 may be an existing device such as a wireless power supply device (not shown) or an electrical power distribution board (not shown). That is, the light reflector 11 can be used while being attached to the existing device.

The shape (outer shape) of the housing 22 is arbitrary as long as the laser light 80 from the LIDAR 60 to the light reflector 11 and the reflected light 81 from the light reflector 11 to the LIDAR 60 are not interrupted and the traveling of the vehicle 50 is not disturbed. The housing can be installed at various positions such as on the ground (road surface) (FIG. 9A), on a wall surface (FIG. 9B), or embedded in the ground (under the road surface) (FIG. 9C).

The vehicle guidance device 10 may also include the power supply unit 15. The power supply unit 15 performs wireless power supply to a power reception device (not shown) of the vehicle 50 at a parking space as the target position. In this case, the housing 22 accommodates the power supply unit 15 together with the light reflector 11, and is installed at the position where electric power can be supplied by the power supply unit 15 (e.g., on the ground (road surface) in the parking space) (see FIG. 9E).

Figure 10A:
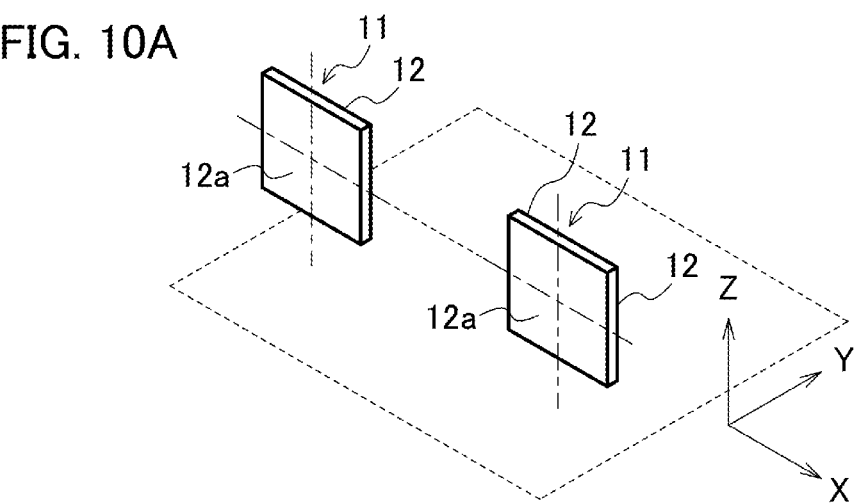
FIGS. 10A to 10C are diagrams illustrating examples of arrangement of retroreflectors in a case where light reflectors are provided.
Figure 10B:
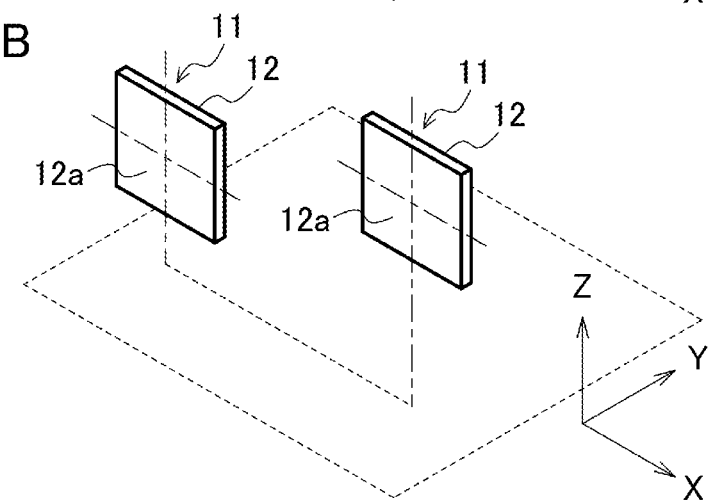
Figure 10C:
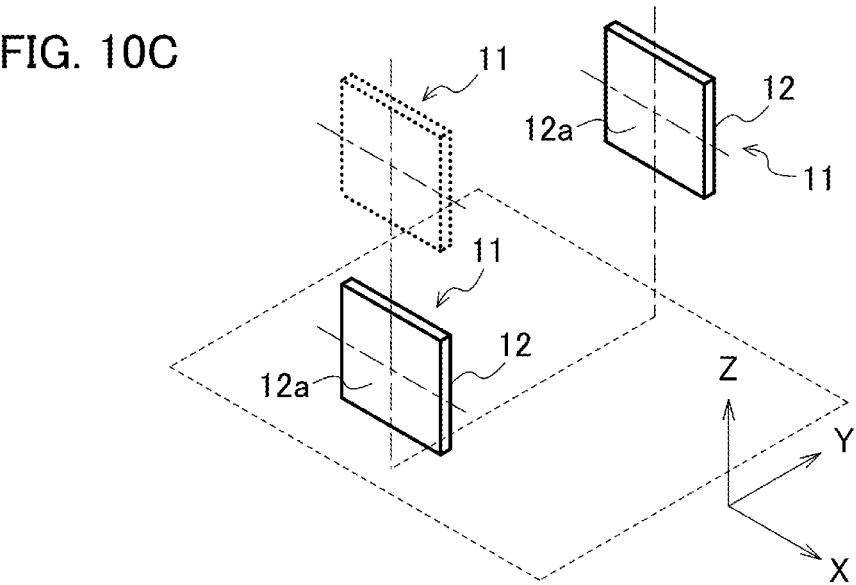

FIGS. 10A to 10C are diagrams illustrating examples of arrangement of light reflectors 11. As shown in these figures, two or more (i.e., at least two) light reflectors 11 may be provided for one target position. For convenience of explanation, a case where the number of the light reflectors 11 is two will be described, and the reflection setter 30 such as the optical shutter 13 is omitted in FIGS. 10A to 10C.

As shown in FIGS. 10A to 10C, when the two light reflectors 11 are projected on the XY plane (horizontal plane) along the Z direction (vertical direction), they are positioned apart from each other by a predetermined distance. For example, as shown in FIGS. 10A and 10B, the two light reflectors 11 are located on the XZ plane and are separated by a predetermined distance in the X direction. Alternatively, as shown in FIG. 10C, the two light reflectors 11 are located in the YZ plane and separated by a predetermined distance in the Y direction. The heights of the two light reflectors 11 (retroreflectors 12) along the Z direction may be the same as shown in FIG. 10A, or may be different as shown in FIGS. 10B and 10C.

By arranging two or more light reflectors 11 for one target position, the direction of the vehicle with respect to the target position can be specified. For example, as shown in FIGS. 10A to 10C, it is assumed that two light reflectors 11 are arranged for one target position. As the LIDAR 60 scans the laser light 80 in the left-right direction, the autonomous drive controller 70 of the vehicle 50 specifies the positions of the reflection points identified as reflection surfaces 12a. Further, the autonomous drive controller 70 specifies a direction connecting (passing through) the two reflection points as viewed from the vehicle 50 (LIDAR 60). Hereinafter, this specified direction will be referred to as an arrangement direction for convenience of explanation.

This arrangement direction is one of the tangential directions of the plane including the two reflection points. The plane including the two reflection points is a plane parallel to the XZ plane in FIGS. 10A and 10B, and a plane parallel to the YZ plane in FIG. 10C. Accordingly, the autonomous drive controller 70 can specify the orientation of the vehicle 50 with respect to the plane including the two reflection points based on the specified arrangement direction. The autonomous drive controller 70 performs steering so that the specified direction of the vehicle 50 is directed to a predetermined direction. In the examples as shown in FIGS. 10A and 10B, the predetermined direction is, for example, a direction which is included in a predetermined plane (e.g., the horizontal plane or the road surface of the vehicle 50) and is orthogonal to a plane including two reflection points. In the example as shown in FIG. 10C, the predetermined direction is a direction which is included in a predetermined plane (e.g., the horizontal plane or the road surface of the vehicle 50) and is parallel to a plane including the two reflection points.

When two or more light reflectors 11 are provided for one target position, the LIDAR 60 receives the reflected light 81 of the laser light 80 having a very high intensity by the number of light reflectors 11. The arrangement of the two or more light reflectors 11 (i.e., the arrangement direction and their relative positions, etc.) is predetermined. Therefore, information on these may be stored in the autonomous drive controller 70 of the vehicle 50, for example, by communication with the communication unit 14 when entering the parking area 100.

Only when reflected lights 81 are received by the LIDAR 60 (i.e., detector 63 of the LIDAR 60) and the arrangement of the two or more light reflectors 11 specified by the received lights coincides with a predetermined arrangement, it is determined that the light reflector 11 is associated with the target position. For example, when two or more light reflectors 11 are arranged vertically, it is determined that the light reflector 11 is associated with the target position only when positions, at which the reflected lights 81 are strong, are arranged vertically. By determining that the light reflector is the light reflector 11 associated with the target position, it is possible to reduce the possibility of misidentifying other positions, at which the intensity of the reflected light 81 has accidentally increased, as the light reflector 11 associated with the target position. This effect can also be obtained, for example, when the light reflectors 11 are arranged in a line along the Z direction together with the light reflectors 11 shown by dotted lines in FIG. 10C.

Autonomous driving may be a controlled cruise referred to as automatic driving. Since the autonomous driving according to the present disclosure is an operation of the vehicle toward a parking space, it may be a controlled cruise referred to as automatic parking.

The present disclosure is not limited to the embodiment described above and is defined in the descriptions of the scope of claims, and the present disclosure includes all sorts of modifications with equivalent meanings and within the scope of the descriptions in the scope of claims.

What is claimed is:

1. A vehicle guidance device comprising:
   at least one light reflector including:
      a retroreflector configured to reflect laser light for distance measurement emitted from a vehicle for autonomous driving; and
      a reflection setter configured to set either a first state in which the laser light is retroreflected from the retroreflector toward the vehicle, or a second state in which the laser light is not retroreflected from the retroreflector toward the vehicle; and
   a controller configured to cause the reflection setter to set the first state by setting a target position of the vehicle associated with the light reflector and causes the reflection setter to set the second state after the vehicle arrives at the target position.

2. The vehicle guidance device according to claim 1, wherein
   the reflection setter includes an optical shutter provided on an optical path of the laser light toward the retroreflector, and
   the controller is configured to open the optical shutter as a setting of the first state and close the optical shutter as a setting of the second state.

3. The vehicle guidance device according to claim 1, wherein
   the reflection setter is attached to the retroreflector and includes a drive mechanism for setting an angle of the retroreflector with respect to the optical path of the laser light toward the retroreflector, and
   the controller is configured to set by the drive mechanism the retroreflector at an angle at which the retroreflector is positioned on the optical path as a setting of the first state, and is configured to set by the drive mechanism the retroreflector at an angle at which the retroreflector deviates from the optical path as a setting of the second state.

4. The vehicle guidance device according to claim 1, wherein
the at least one light reflector includes a plurality of light reflectors for the target position.

5. The vehicle guidance device according to claim 1, further comprising
a housing configured to house the at least one light reflector, including a window portion provided on the optical path, the window portion being formed of an optically transparent material.

6. The vehicle guidance device according to claim 1, further comprising
a housing with an outer surface to which the at least one light reflector is attached.

7. The vehicle guidance device according to claim 1, wherein
the controller is configured to acquire information about the vehicle, and select the target position from predetermined candidate positions to which the vehicle can move based on the acquired information.

8. The vehicle guidance device according to claim 1, further comprising
a power supply unit configured to wirelessly supply electric power to a power reception device of the vehicle at the target position.

9. The vehicle guidance device according to claim 1, wherein
the target position is a parking space for the vehicle, and the at least one light reflector is installed at the parking space.

10. The vehicle guidance device according to claim 1, wherein
the target position is a passing point on a traveling route leading to a parking space for the vehicle, and
the at least one light reflector is installed at the passing point.

11. A parking area comprising a vehicle guidance device according to claim 1.

12. A vehicle guidance method comprising:
setting a first state in which laser light is retroreflected at a predetermined position associated with a target position from a predetermined position toward a vehicle by setting of the target position of the vehicle which emits the laser light for distance measurement for autonomous driving; and
setting a second state in which the laser light is not retroreflected at the predetermined position from the predetermined position toward the vehicle after the vehicle arrives at the target position.

13. The vehicle guidance method according to claim 12, further comprising
wirelessly supplying electric power to a power reception device of the vehicle at the target position.

14. The vehicle guidance method according to claim 12, further comprising:
acquiring information about the vehicle; and
selecting the target position from predetermined candidate positions to which the vehicle can move based on the acquired information.

15. The vehicle guidance method according to claim 13, further comprising:
acquiring information about the vehicle; and
selecting the target position from predetermined candidate positions to which the vehicle can move based on the acquired information.

* * * * *